US009626379B1

(12) United States Patent
Allen

(10) Patent No.: US 9,626,379 B1
(45) Date of Patent: Apr. 18, 2017

(54) OPTIMISTIC COMMIT PROCESSING FOR AN OFFLINE DOCUMENT REPOSITORY

(75) Inventor: Nicholas A. Allen, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 253 days.

(21) Appl. No.: 13/240,563

(22) Filed: Sep. 22, 2011

(51) Int. Cl.
*G06F 17/30* (2006.01)

(52) U.S. Cl.
CPC .... *G06F 17/3023* (2013.01); *G06F 17/30309* (2013.01)

(58) Field of Classification Search
CPC ........ G06F 17/30; G06F 8/71; G06F 17/2288; G06F 17/30162; G06F 17/30575
USPC ....... 707/608, 609, 613, 615, 616, 624, 625, 707/638, 695, E17.008, 999.008, 999.01, 707/999.203
See application file for complete search history.

(56) References Cited

U.S. PATENT DOCUMENTS

| | | | | |
|---|---|---|---|---|
| 6,581,075 | B1* | 6/2003 | Guturu | G06F 17/30578 |
| 2003/0018714 | A1* | 1/2003 | Mikhailov et al. | 709/203 |
| 2005/0066225 | A1* | 3/2005 | Rowan et al. | 714/5 |
| 2006/0101092 | A1* | 5/2006 | Ishida | G06F 8/71 |
| 2007/0130341 | A1* | 6/2007 | Ma | 709/226 |
| 2007/0244905 | A1* | 10/2007 | Ito | G06F 8/65 |
| 2007/0299969 | A1* | 12/2007 | Kunitake | G06F 17/30011 709/225 |
| 2008/0104141 | A1* | 5/2008 | McMahon | 707/203 |
| 2010/0131940 | A1* | 5/2010 | Jazdzewski | 717/170 |
| 2010/0145914 | A1* | 6/2010 | Kanno et al. | 707/638 |
| 2011/0138126 | A1* | 6/2011 | Blundell et al. | 711/125 |
| 2011/0179080 | A1* | 7/2011 | Miyazaki | G06F 17/30241 707/772 |
| 2011/0276956 | A1* | 11/2011 | Yuki | G06F 8/65 717/170 |

OTHER PUBLICATIONS

U.S. Appl. No. 12/018,401, filed Jan. 23, 2008, titled "Coordinating Resources Using a Volatile Network Intermediary", Inventors: Allen et al.
U.S. Appl. No. 12/019,041, filed Jan. 24, 2008, titled "Coordinating Application State and Communication Medium State", Inventors: Allen et al.

(Continued)

*Primary Examiner* — Miranda Huang
(74) *Attorney, Agent, or Firm* — Lee & Hayes, PLLC

(57) ABSTRACT

A revision request is received at a revision control system that includes a repository identifier, version summary information, and a change description. In response to receiving the revision request, a determination is made as to whether a document repository identified by the repository identifier is active or offline. If the document repository is offline, the version summary information is utilized to determine whether the revision request is probably consistent with current contents of the document repository. If the revision request is probably consistent with the current contents of the document repository, the revision request is placed into a queue, an acceptance message is transmitted in response to the revision request, the document repository is placed into an active state, and the revision request is dequeued and applied to the document repository using the change description.

19 Claims, 6 Drawing Sheets

(56) References Cited

OTHER PUBLICATIONS

U.S. Appl. No. 12/023,993, filed Jan. 31, 2008, titled "Queued Message Dispatch", Inventors: Pinto et al.
U.S. Appl. No. 12/129,580, filed May 29, 2008, titled "Queue Dispatch Using Deferred Acknowledgment", Inventors: Allen et al.
U.S. Appl. No. 12/605,236, filed Oct. 23, 2009, titled "Dispatch Mechanism for Coordinating Application and Communication Medium State", Inventors: Pinto et al.

* cited by examiner

OPTIMISTIC COMMIT PROCESSING FOR AN OFFLINE DOCUMENT REPOSITORY

BACKGROUND

Revision control systems provide functionality for storing and managing versions of electronic documents. In order to provide this functionality, revision control systems typically maintain one or more document repositories. These repositories store electronic documents along with data that describes changes made to the documents by users of the revision control system.

Users of revision control systems may submit requests to make revisions to a document to document repositories at unpredictable intervals. When a revision request is received, a repository might be in an active state in which it is ready to receive revision requests, or in an offline state in which the repository cannot accept revision requests. Repositories in the active state consume computing resources continuously while repositories in the offline state do not. Repositories in the offline state must be restored to the active state before they can receive revision requests.

The usage of resources by active repositories might impose a scalability limitation on some revision control systems. For example, the consumption of resources by active repositories might prevent a revision control system from scaling to manage a large number of repositories. Repositories may be placed into an offline state in order to free the associated resources. However, restoring repositories to the active state can be a time-consuming operation. Users submitting revision requests to a revision control system may be frustrated by the time required to restore a document repository to the active state.

Some previous revision control systems provide functionality for allowing a user to commit changes to a repository that is in the offline state. These previous systems have typically relied on accessing a copy of the repository, determining that the commit can be made to the copy of the repository, updating the copy of the repository and, at a much later time (such as hours, days, or even weeks), attempting to merge the copy of the repository with the original repository. This approach, however, has several drawbacks. First, maintaining a copy of the repository may require considerable computing resources and may also limit scalability for hosting many repositories. Second, the act of merging two repositories may require labor-intensive, manual reconciliation work depending on how greatly the copy of the repository has diverged from the original repository.

It is with respect to these and other considerations that the disclosure made herein is presented.

DETAILED DESCRIPTION

Figure 1:
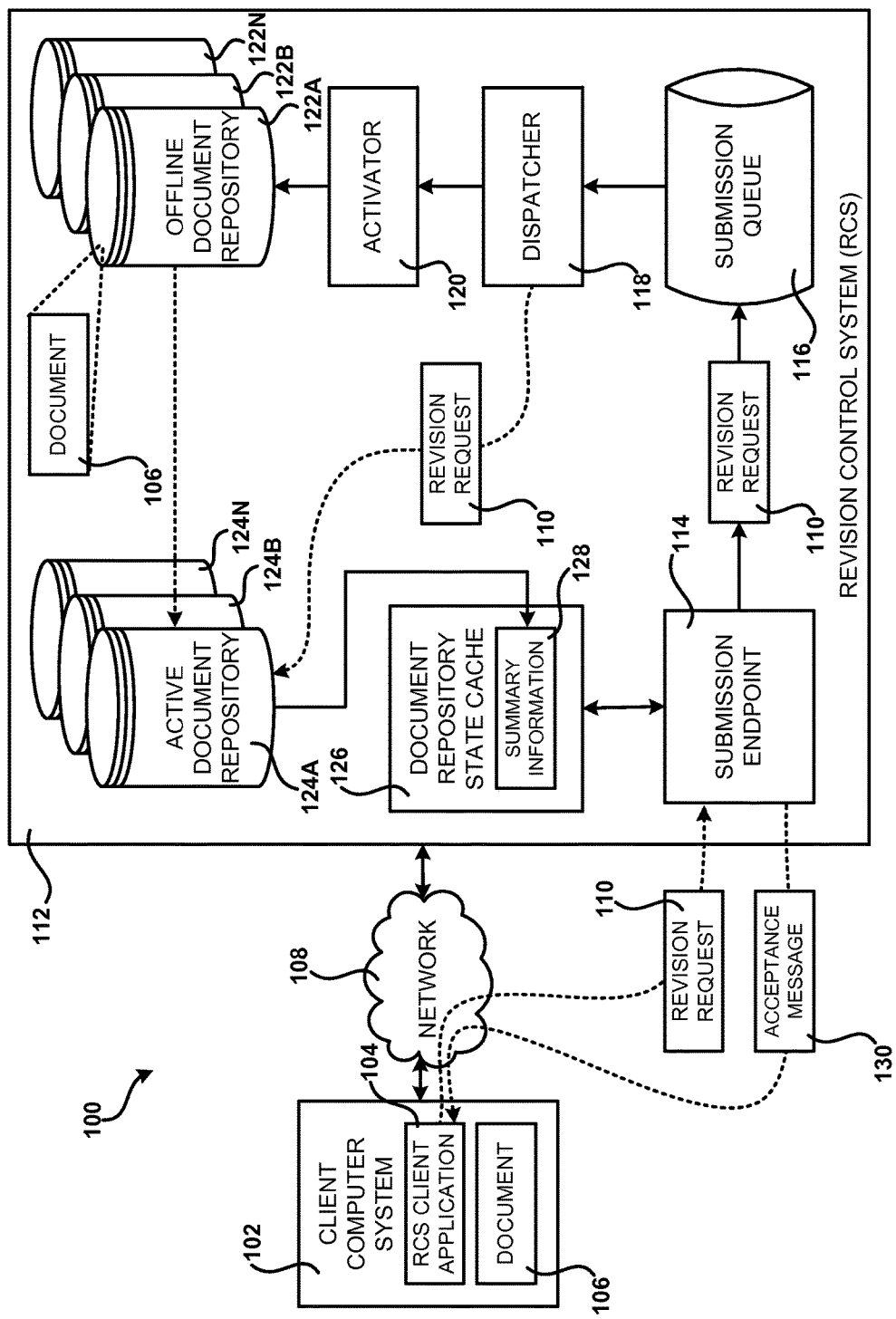
FIG. 1 is a system and network diagram showing aspects of one illustrative operating environment for the embodiments disclosed herein for optimistic commit processing for an offline document repository.

The following detailed description is directed to technologies for optimistic commit processing for an offline document repository. Utilizing the technologies described herein, some revision requests directed to an offline document repository can be indicated as completed to the requestor prior to the actual commitment of the revision requests without the use of a copy of the document repository. As a result, it is not necessary to maintain a copy of the document repository nor is it necessary to merge two repositories using the technologies described herein. Additionally, users of an offline document repository do not have to endure the lengthy time previously required for an offline repository to be placed into an active state.

According to one aspect disclosed herein, a revision control system ("RCS") is provided that is configured for optimistic commit processing. In one implementation, the RCS includes one or more document repositories that are configured to receive and process requests to revise their contents ("revision requests"). The document repositories might be either in an active state in which revision requests can be received or in an offline state in which revision requests cannot be received.

In various embodiments, the RCS disclosed herein might also include an activator, a submission queue, a document repository state cache, and a dispatcher. The activator is configured to cause document repositories to move from the offline state to the active state. The submission queue is a queue configured to store revision requests awaiting processing by the document repositories. The document repository state cache is a cache configured to store summary information about the current contents of the document repositories. The dispatcher is configured to periodically dequeue a revision request from the submission queue, to instruct the activator to place the document repository for the dequeued revision request into the active state, and to provide the revision request to the document repository once activated.

The RCS also includes a submission endpoint configured to receive a revision request from a client application. The revision request might include a repository identifier that identifies a document repository, version summary information that describes the expected contents of the revision request, and a change description that describes a change to be made to the document repository. In response to receiving a revision request, the submission endpoint determines whether the document repository identified by the repository identifier is in the active state or in the offline state. If the document repository is in the offline state, the submission endpoint determines whether the revision request is probably consistent with the current contents of the document repository.

In order to determine whether the revision request is probably consistent with the current contents of the document repository, the submission endpoint might compare the summary information stored in the document repository state cache to the version summary information received with the revision request. In one embodiment, the summary information stored in the document repository state cache must exactly match the version summary information in order for the revision request to be considered probably consistent with the document repository. In other embodiments an exact match is not required in order for the revision request to be considered probably consistent with the document repository.

In one embodiment, the summary information stored in the document repository state cache and the version summary information received with the revision request include a single representation of the current contents of the document repository. For instance, a single version number, hash value, or time stamp might be utilized to represent the current contents of an entire document repository, one or more files in the document repository, or a portion of one or more files in the repository.

In another embodiment, the summary information stored in the document repository state cache and the version summary information received with the revision request include multiple representations of the current contents of the document repository. In this embodiment, for instance, multiple version numbers, hash values, or time stamps, might be utilized to represent all or a portion of the current contents a document repository. Additionally, in this embodiment the various representations of the current contents of the document repository may be compared in a preferential order to determine whether a revision request is probably consistent with the document repository.

If the submission endpoint determines that the revision request is probably consistent with the current contents of the document repository, the submission endpoint places the revision request into the submission queue. The submission endpoint also transmits an acceptance message to the client application that submitted the revision request indicating that the revision request has been accepted, even though the revision request has not yet been committed to the document repository.

After the revision request has been placed into the submission queue, the dispatcher dequeues the revision request and instructs the activator to place the document repository identified by the revision request into the active state. Once the document repository has been placed into the active state, the dispatcher provides the revision request to the document repository. The document repository then applies the change description to its contents. The document repository will also atomically update the summary information stored in the document repository state cache to reflect the new contents of the document repository. Additional details regarding the various components and processes described above will be provided below with regard to FIGS. 1-4.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and its associated description are intended to provide a description of a suitable computing environment in which the embodiments described herein may be implemented. In particular, FIG. 1 is a system and network diagram that shows an illustrative operating environment 100 for the embodiments disclosed herein that includes a client computer system 102 and an RCS 112 that are interconnected by a network 108. As will be described in greater detail below the RCS 112 may, in many cases, allow a revision request for an offline repository to be immediately accepted with a small probability of later failing to commit the revision.

The RCS 112 provides functionality for storing and managing versions of electronic documents, such as the document 106. The documents stored and managed by the RCS 112 may include any type of structured electronic data, including but not limited to source code, word processing documents, spreadsheet documents, presentation documents, databases, text documents, word wide web ("Web") pages, scripts, and other types of electronic data.

In order to provide the functionality described herein, the RCS 112 maintains the document repositories 122A-122N, which may be referred to herein as offline document repositories, and the document repositories 124A-124N, which may be referred to herein as active document repositories. These repositories store the electronic documents along with data that describes changes made to the documents by users of the RCS 112. The repositories 122A-122N and 124A-124N might also store other data not described herein. Additional details regarding the operation of the document repositories 122A-122N and 124A-124N will be provided below.

As shown in FIG. 1 and described briefly above, a client computer system 102 may be utilized in conjunction with the RCS 112. The client computer system 102 is any type of computer system capable of executing an RCS client application 104. The RCS client application 104 provides functionality for interacting with the RCS 112. The RCS client application 104 might also provide other functionality, such as functionality for creating and/or revising a document 106 stored in one of the document repositories 122A-122N and 124A-124N. In this regard, the RCS client application 104 might be a command line program for editing the document 106, a standalone editing application such as an integrated development environment ("IDE"), or a Web client for interacting with functionality provided by the RCS 112. The RCS client application 104 might also be implemented in other ways not disclosed herein.

According to one implementation, the RCS client application 104 executing on the client computer system 102 transmits a revision request 110 to the RCS 112 by way of the network 108 and awaits a response. The client computer system 102 may transmit the revision request 110 to the RCS 112 using a network transport, such as over, for example, Hypertext Transfer Protocol Secure ("HTTPS"), Secure Shell ("SSH") tunneling protocols, or another appropriate protocol.

A submission endpoint 114 within the RCS 112 receives the revision request 110 on behalf of the repositories 122A-122N and 124A-124N. The submission endpoint 114 is a software or hardware component that acts as a proxy for the document repositories 122A-122N and 124A-124N. Details regarding the operation of the submission endpoint 114 are provided below.

Figure 2:
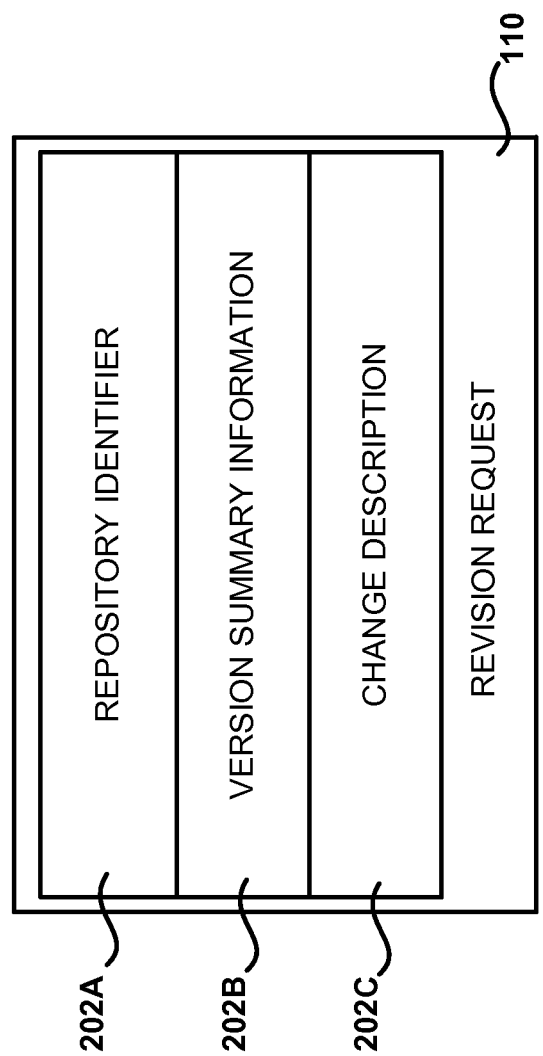
FIG. 2 is a data structure diagram showing aspects of a revision request utilized in the various embodiments disclosed herein for optimistic commit processing for an offline document repository.

Referring momentarily to FIG. 2, details regarding the structure and contents of the revision request 110 will be provided. As illustrated in FIG. 2, the revision request 110 transmitted by the RCS client application 104 might include several fields 202A-202C. For instance, in one embodiment, the revision request 110 includes a field 202A for storing a repository identifier. The repository identifier includes data identifying the document repository that is the target of the revision request 110. The repository identifier may be expressed as a uniform resource locator ("URL"), globally unique identifier ("GUID"), or using other data that uniquely identifies one of the repositories 122A-122N and 124A-124N for which the submission endpoint 114 acts as a proxy.

The revision request 110 also includes a field 202B for storing version summary information in one embodiment. The version summary information describes the expected contents of the document repository that is the target of the revision request 110. The version summary information may be in a repository-specific format that can be processed by the submission endpoint 114. For example, the version summary information may describe the expected contents of the repository using elements such as: the repository as a whole, a group of files in the repository, a file in the repository, or a portion or line of a file in the repository. The version summary information may describe the elements of the repository using for example one of: a monotonically incremented version number, a timestamp of the last time the element was changed, or a hash of the element contents. Other types of repository-specific and non-specific data might also be utilized to describe the expected contents of the target document repository.

The revision request 110 also includes a field 202C for storing a change description in an embodiment. The change description describes the change to be made to the document repository that is the target of the revision request 110. The change description may be in a repository-specific or non-specific format that can be processed by the identified repository. For example, the change description may include deltas to apply to a document 106 in the repository, the contents of a file to replace in the repository, or even entirely new contents to replace the existing repository.

According to various embodiments, a revision request 110 might reference certain version summary information as a prerequisite. For example, a revision request 110 may reference that a specific file being modified by the request had a version number three at the time that the revision request was constructed.

In other embodiments the revision request 110 may reference multiple version summary information. For example, a revision request 110 may reference that: first, the specific file being modified by the request had a version number three; second, the directory containing the file was last modified at 1:17 PM on Jun. 16, 2011; and third, the document repository as a whole had a hash value of 0x12345678. It should be appreciated that these examples are merely illustrative and that other types of version summary information might be referenced individually or in combination. It should also be appreciated that the data structure shown in FIG. 2 is merely illustrative and that the revision request 110 might be constructed in other ways using other types of data.

Returning now to FIG. 1, additional details regarding the operation of the RCS 112 and the submission endpoint 114 will be provided. Following the receipt of a revision request 110, the submission endpoint 114 determines whether the document repository stored in the field 202A of the revision request 110 is in the active state or in the offline state. In FIG. 1, for instance, the repositories 122A-122N are in the offline state and the repositories 124A-124N are in the active state. In the example shown in FIG. 1, the document 106 stored in the document repository 122A is the target of the revision request 110. Accordingly, in this example, the submission endpoint 114 will conclude that the desired document repository 122A is in the offline state.

In response to determining that the desired repository 122A is in the offline state, the submission endpoint 114 is further configured to determine whether the revision request 110 is probably consistent with the current contents of the target repository 122A. In one embodiment, the submission endpoint 114 makes this determination utilizing summary information 128 stored in a document repository state cache 126. The summary information 128 is data that describes the current contents of the document repositories 122A-122N and 124A-124N. As will be described in greater detail below, the document repositories 124A-124N may update the summary information 128 following the application of a revision request 110. The summary information 128 might also be updated by other components at other times as disclosed herein.

In order to determine whether the revision request 110 is probably consistent with the contents of the document repository 122A, the submission endpoint 114 accesses the document repository state cache 126 using the repository identifier stored in the field 202A of the revision request 110 to retrieve the summary information 128 for the repository 122A being updated. The submission endpoint 114 then compares the summary information 128 retrieved from the document repository state cache 126 to the version summary information stored in the field 202B of the revision request 110 to determine whether the revision request 110 is probably consistent.

For example, the field 202B of the revision request 110 might indicate that the file in the repository 122A that is being modified by the revision request 110 had a version number three and the summary information 128 in the document repository state cache 126 may indicate that the file currently has a version number three. Based on this comparison, the submission endpoint 114 may determine that the revision request 110 is probably consistent with the current contents of the repository 122A. If the values are different, the submission endpoint 114 may conclude that the revision request 110 is not probably consistent with the target document repository 122A.

In one embodiment, the submission endpoint 114 compares the summary information 128 from the document repository state cache 126 to the version summary information in the revision request 110 in a preferential order. For example, the revision request 110 may reference that: first, a directory containing the file to be changed was last modified at 1:17 PM on Jun. 16, 2011; and second, the repository as a whole had a hash value of 0x12345678. The summary information 128 stored in the document repository state cache 126 may indicate that: as a first preference, the file being modified by the change has a version number three; as a second preference, the directory containing the file to be changed was last modified at 1:17 PM on Jun. 16, 2011; and as a third preference, the repository as a whole has a hash value of 0x9abcdef0.

In this example, the submission endpoint 114 may select for comparison the most preferential summary information contained in both the summary information 128 in the document repository state cache 126 and the version summary information in the revision request 110. The first preference cannot be compared, as it is not described by the revision request. Based on the comparison of the second preference, the submission endpoint 114 may determine that the revision request 110 is probably consistent. Although the third preference would not match, the submission endpoint 114 may disregard this as more preferential summary information does match. It should be appreciated that this example is merely illustrative and that other types of preferential comparisons might also be made.

In some embodiments, the submission endpoint 114 requires an exact match between the summary information 128 stored in the document repository state cache 126 and the version summary information contained in the revision request 110. In other embodiments, the submission endpoint 114 does not require an exact match. For example, the submission endpoint 114 may be configured to permit a maximum clock skew of one minute in a timestamp for a revision request 110 to be considered probably consistent. In this example, the repository state cache 126 may indicate that a directory containing the file to be changed was last modified at 1:17 PM on Jun. 16, 2011. The submission endpoint 114 may determine that the revision request 110 is probably consistent if the desired change references that the directory containing the file was last modified between 1:16 PM on Jun. 16, 2011 and 1:18 PM; the submission endpoint 114 may determine that the revision request 110 is not probably consistent if the timestamp fell outside that time range.

In some embodiments the repository state cache 126 may vary the type of summary information 128 stored among repositories. For example, the repository state cache 126 may cache summary information 128 for each file of a frequently accessed repository but cache summary information only for the whole repository for an infrequently accessed repository. The repository state cache 126 might also vary the manner in which the summary information 128 is stored in other ways.

If the submission endpoint 114 determines that the revision request 110 is probably consistent with the contents of the target document repository 122A, the submission endpoint 114 enqueues the revision request 110 into a submission queue 116. The submission endpoint 114 may connect to, for example, a durable message queue into which the revision request 110 can be written.

In some embodiments the submission queue 116 stores revision requests 110 by a particular user for a particular repository in the order that they were received, but may not provide a consistent order for revision requests 110 between different repositories or between different users. For example, the submission queue 116 may reorder a revision request 110 received for a first repository with a revision request received for a second repository. Not requiring an absolute ordering of revision requests 110 may be beneficial to the scalability or availability of the RCS 112.

When the submission endpoint 114 places the revision request 110 into the submission queue 116, the submission endpoint may also update the summary information 128 in the repository state cache 126 atomically together with placing the revision request 110 into the submission queue 116. For instance, in one embodiment the submission endpoint 114 computes new summary information 128 based on the revision request 110 and puts the new summary information into the repository state cache 126.

In another embodiment the submission endpoint 114 locks the target document repository to the user that submitted the revision request 110 by indicating that revision requests submitted by any other user are to be considered not probably consistent until the first revision request 110 resolves. In other embodiments the submission endpoint 114 indicates that all revision requests 110 are to be considered not probably consistent, including from the user that submitted the first revision request 110, until the first revision request 110 resolves. In yet other embodiments, the submission endpoint 114 also stores data for use in rolling back the document repository state cache 126 in the event that the revision request 110 cannot be applied to the desired document repository.

Once the submission endpoint 114 has placed the revision request 110 in the submission queue 116, the submission endpoint 114 may transmit an acceptance message 130 for the revision request 110 to the RCS client application 104 executing on the client computer system 102. In response to receiving the acceptance message 130, the RCS client application 104 may inform the user that their change has been committed to the document repository even though the revision request 110 is only probably consistent and may later fail to complete. The submission endpoint 114 may also include a mechanism for notifying the user if a revision request 110 later fails to complete. Once the RCS client application 104 has received the acceptance message 130, it may permit the user to continue revising the document 106.

As shown in FIG. 1, the RCS 112 also includes a dispatcher 118 in one embodiment. The dispatcher 118 is a software or hardware component that is configured to asynchronously retrieve revision requests 110 from the submission queue 116. For example, the dispatcher 118 may periodically connect to a message queue and retrieve a notification containing a revision request 110.

According to various embodiments, the dispatcher 118 may be configured to throttle retrieving revision requests 110. In one embodiment, for instance, the dispatcher 118 may run on a periodic basis processing a limited number of revision requests 110 per unit time. In another embodiment, the dispatcher 118 may schedule retrieving revision requests 110 based on resource availability. For example, the dispatcher 118 may retrieve revision requests 110 when free memory is available and refrain from retrieving revision requests 110 when free memory is low. The dispatcher 118 might also be configured to vary the processing of revision requests 110 from the submission queue 116 based upon other factors and considerations.

The dispatcher 118 is also configured to determine whether the repository that is the target of a dequeued revision request 110 is in the offline state or the active state. If the target repository is in the offline state, the dispatcher 118 is configured to request that an activator 120 put the target repository in the active state. The activator 120 is a software or hardware component that is configured to place an offline document repository, such as one of the document repositories 122A-122N, into the active state. For instance, in the example shown in FIG. 1, the activator 120 has placed the document repository 122A into the active state.

The activator 120 may put a repository in the active state by, for example, loading the repository from disk into main memory and starting a thread that listens for requests for the repository. The activator 120 might also perform other functions to put a document repository into the active state.

Once the activator 120 has placed a target document repository into the active state, the dispatcher 118 may pass the revision request 110 to the active repository. The dispatcher 118 may transmit the revision request to the active repository using a network transport, such as over, for example, HTTPS or SSH tunneling protocols. Other mechanisms might also be utilized to provide the revision request 110 to the active document repository.

It should be appreciated that the submission endpoint 114 and the target document repository may use the same protocols to facilitate a user directly sending subsequent revision requests 110 directly to the repository, thereby bypassing one or more of the operations described above for efficiency. For example, the submission endpoint 114 may directly forward revision requests 110 for an active repository to the repository, thereby bypassing the submission queue 116 and the dispatcher 118.

When an active document repository receives a revision request 110, the repository applies the revision request 110 and updates the summary information 128 for the repository in the document repository state cache 126. The updated state information 128 may be based on the new contents of the repository. The summary information 128 may be updated atomically with the application of the revision request 110 to the contents of the repository. Additional details regarding the operation of the RCS 112 provided in the various embodiments disclosed herein will be presented below with regard to FIGS. 3A-3C.

Figure 3A:
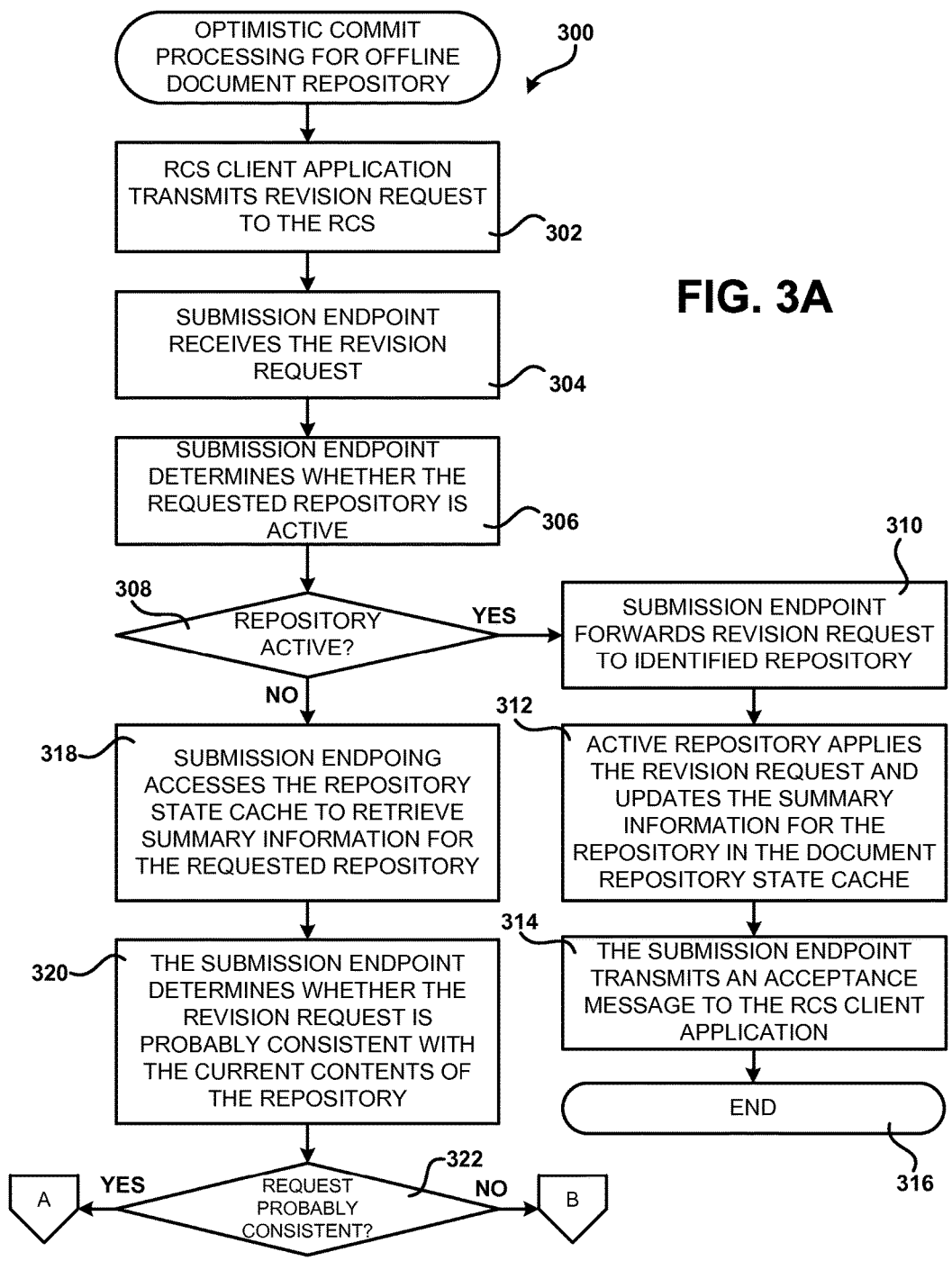
FIGS. 3A-3C are flow diagrams showing one illustrative routine disclosed herein for optimistic commit processing for an offline document repository according to one embodiment disclosed herein.
Figure 3B:
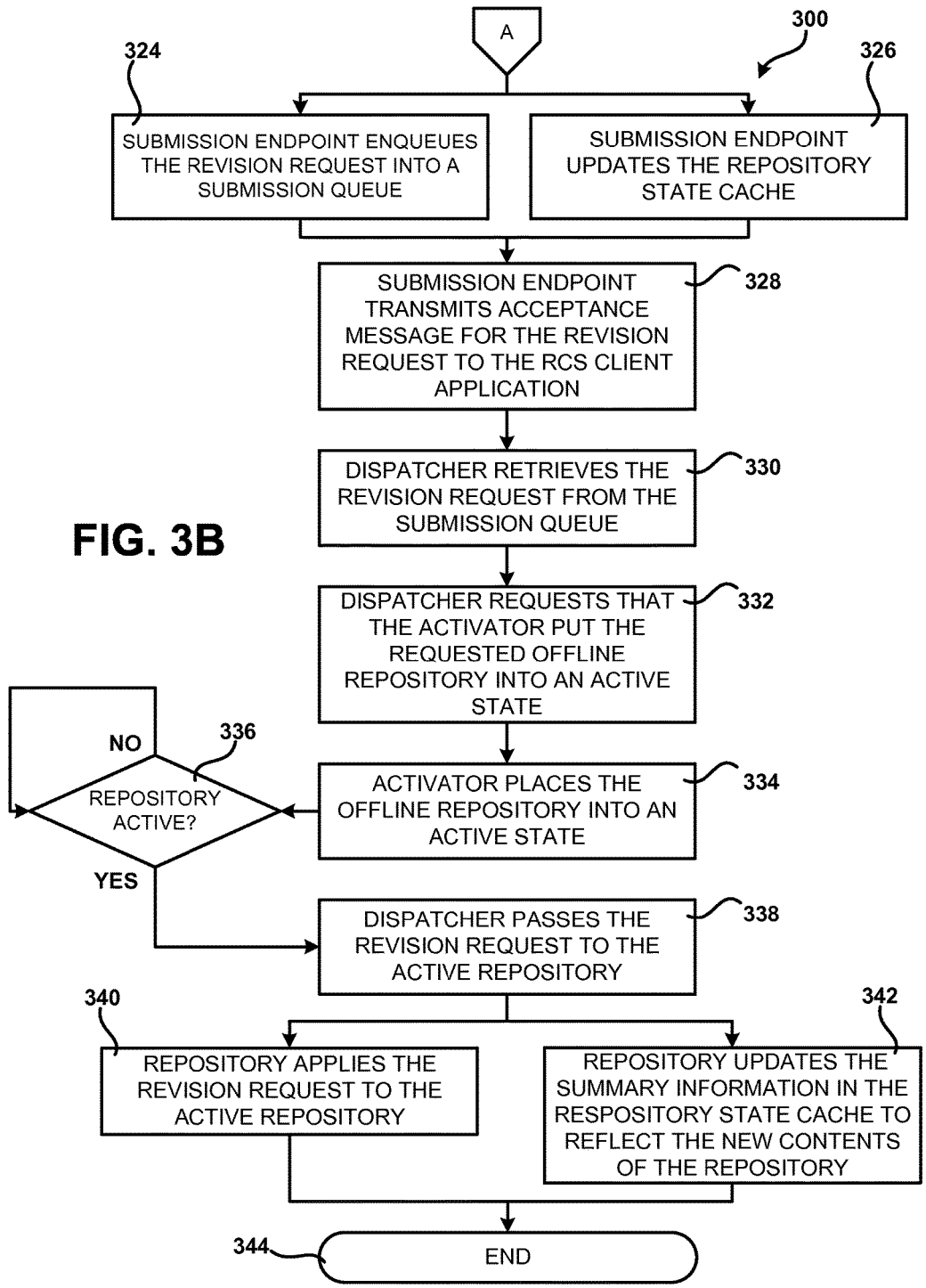
Figure 3C:
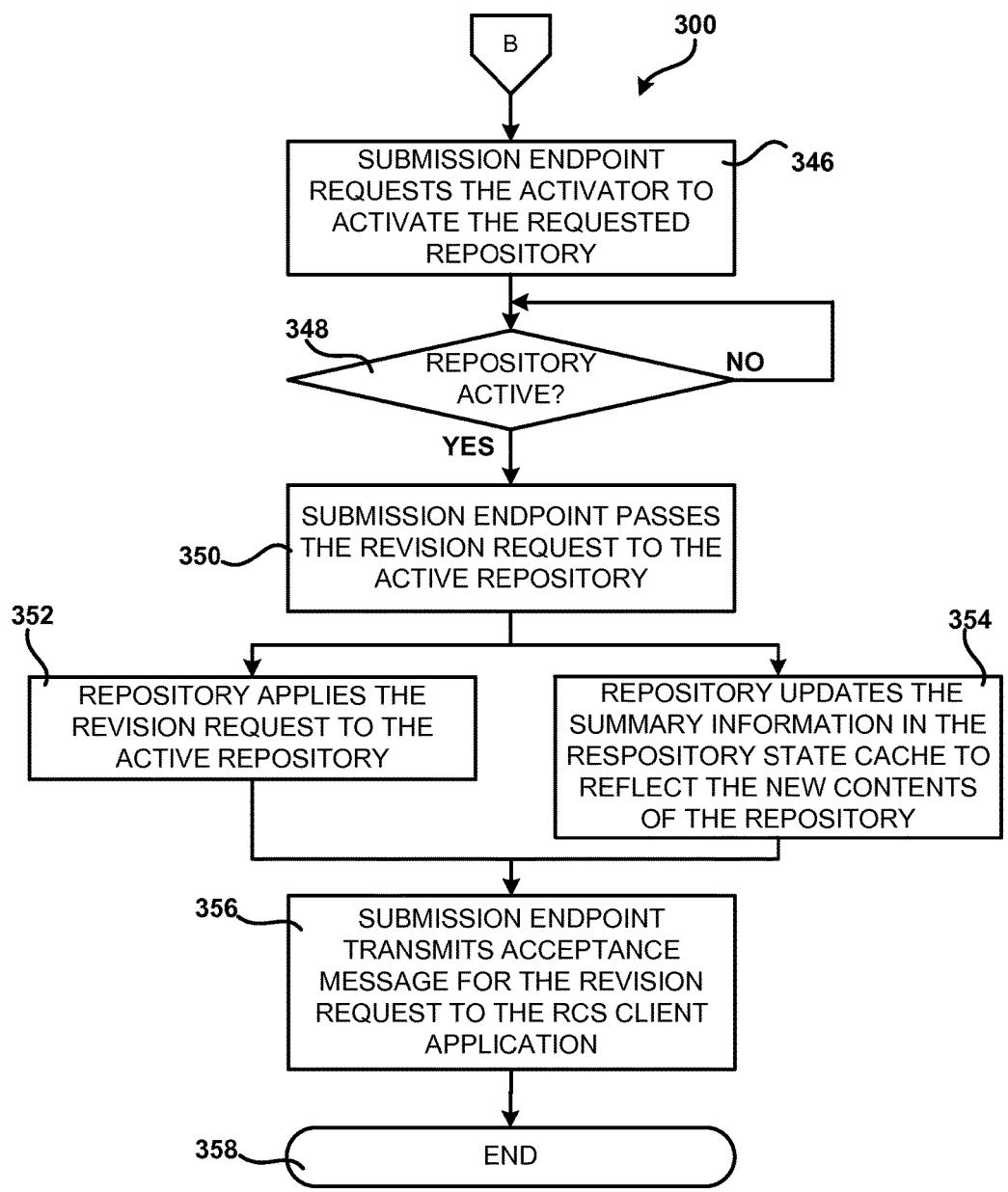

Turning now to FIGS. 3A-3C, additional details will be provided regarding one illustrative process disclosed herein for optimistic commit processing for an offline document repository. It should be appreciated that the logical operations described herein with respect to FIGS. 3A-3C and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIGS. 3A-3C are flow diagrams showing a routine 300 that illustrates aspects of one mechanism disclosed herein for optimistic commit processing for an offline document repository. The routine 300 begins at operation 302, where the RCS client application 104 transmits a revision request 110 to the submission endpoint 114 over the network 108. The submission endpoint 114 receives the revision request 110 at operation 304.

In response to receiving the submission request 110, the submission endpoint 114 determines whether the repository identified by the revision request 110 is in the active state or in the offline state at operation 306. If the repository is active, the routine 300 proceeds from operation 308 to operation 310, where the submission endpoint 114 forwards the revision request 110 to the identified repository. The routine 300 then proceeds to operation 312, where the repository receives the revision request 110, commits the change specified in the revision request 110, and atomically updates the summary information 128 for the repository in the document repository state cache 126 to reflect the updated contents of the repository. Once the repository has processed the revision request 110, the submission endpoint 114 transmits an acceptance message 130 to the RCS client application 104 that made the request at operation 314. The routine 300 then proceeds to operation 316, where it ends.

If, at operation 308, the submission endpoint 114 determines that the target repository is inactive, the routine 300 proceeds from operation 308 to operation 318. At operation 318, the submission endpoint 114 accesses the document repository state cache 126 to retrieve the summary information 128 for the requested repository. As discussed above, the summary information 128 describes the current contents of the target repository.

From operation 318, the routine 300 proceeds to operation 320, where the submission endpoint 114 determines whether the revision request 110 is probably consistent with the current contents of the target repository. As discussed above, this may be accomplished by comparing the summary information 128 stored in the repository state cache 126 to the version summary information received with the revision request 110. As also discussed above, the submission endpoint 114 may or may not require an exact match between the summary information in order to conclude that the revision request is probably consistent, may compare one or more representations of the current state of the repository, and may compare the representations in a preferential order. The submission endpoint 114 might also perform other functions in order to determine whether the revision request 110 is probably consistent with the current contents of the target repository.

If the submission endpoint 114 determines that the revision request 110 is probably consistent, the routine 300 proceeds from operation 322 to operations 324 and 326, shown in FIG. 3B. If the submission endpoint 114 determines that the revision request 110 is not probably consistent, the routine 300 proceeds from operation 322 to operation 346, shown in FIG. 3C and described below.

At operation 324, the submission endpoint 114 enqueues the revision request 110 into the submission queue 116. Atomically with this operation, the submission endpoint 114 also updates the summary information 128 for the target repository in the document repository state cache 126. This occurs at operation 326. As discussed above, the submission endpoint 114 may compute new summary information 128 based on the revision request 110 and place the new summary information into the repository state cache 126, may lock the target document repository to the user that submitted the revision request 110 by indicating that revision requests submitted by any other user are to be considered not probably consistent until the first revision request 110 resolves, and/or may indicate that all revision requests 110 are to be considered not probably consistent, including from the user that submitted the first revision request 110, until the first revision request 110 resolves. The submission endpoint 114 might also store data for use in rolling back the document repository state cache 126 in the event that the revision request 110 cannot be applied to the desired document repository.

From operations 324 and 326, the routine 300 proceeds to operation 328, where the submission endpoint 114 transmits an acceptance message 130 to the RCS client application 104 that submitted the revision request 110. As discussed above, in response to receiving the acceptance message 130 the RCS client application 104 may inform the user that their change has been committed to the document repository even though the revision request 110 is only probably consistent and may later fail to complete. The RCS client application 104 may then permit the user to continue revising the document 106.

From operation 328, the routine 300 proceeds to operation 330, where the dispatcher 118 retrieves the revision request 110 from the submission queue 116. The dispatcher 118 then requests that the activator 120 place the repository referenced by the revision request 110 into the active state at operation 332. At operation 334, the activator 120 places the target repository into the active state. As discussed above, the activator 120 may put a repository in the active state by loading the repository from disk into main memory and starting a thread that listens for requests for the repository. The activator 120 might also perform other functions to put a document repository into the active state.

The routine 300 remains at operation 336 until the repository has entered the active state. Once the repository has become active, the routine 300 proceeds to operation 338 where the dispatcher 118 passes the revision request 110 to the active document repository. The routine 300 then proceeds to operations 340 and 342. At operation 340, the repository attempts to commit the change description in the revision request 110. The repository also atomically updates the summary information 128 in the repository state cache 126 at operation 342 to reflect the new contents of the repository. The routine 300 then proceeds from operations 340 and 342 to operation 344, where it ends.

If the submission endpoint 114 determines at operation 320, described above, that the revision request 110 is not probably consistent with the repository, the routine 300 proceeds from operation 322 to operation 346, shown in FIG. 3C. At operation 346, the submission endpoint 114 requests that the activator 120 activate the repository that is the target of the received revision request 110. The routine 300 then remains at operation 348 until the repository has entered the active state.

Once the repository has entered the active state, the routine 300 proceeds from operation 348 to operation 350. At operation 350, the submission endpoint 114 forwards the revision request 110 to the active repository. The routine 300 then proceeds to operations 352 and 354. At operation 352, the repository receives the revision request 110 and commits the change specified in the revision request 110 to the repository. At operation 354, the repository updates the summary information 128 for the repository in the document repository state cache 126 to reflect the updated contents of the repository. The operations 352 and 354 may be performed atomically.

Once the repository has processed the revision request 110, the routine 300 proceeds from operations 352 and 354 to operation 356, where the submission endpoint 114 transmits an acceptance message 130 to the RCS client application 104 that submitted the revision request. The routine 300 then proceeds to operation 358, where it ends.

Figure 4:
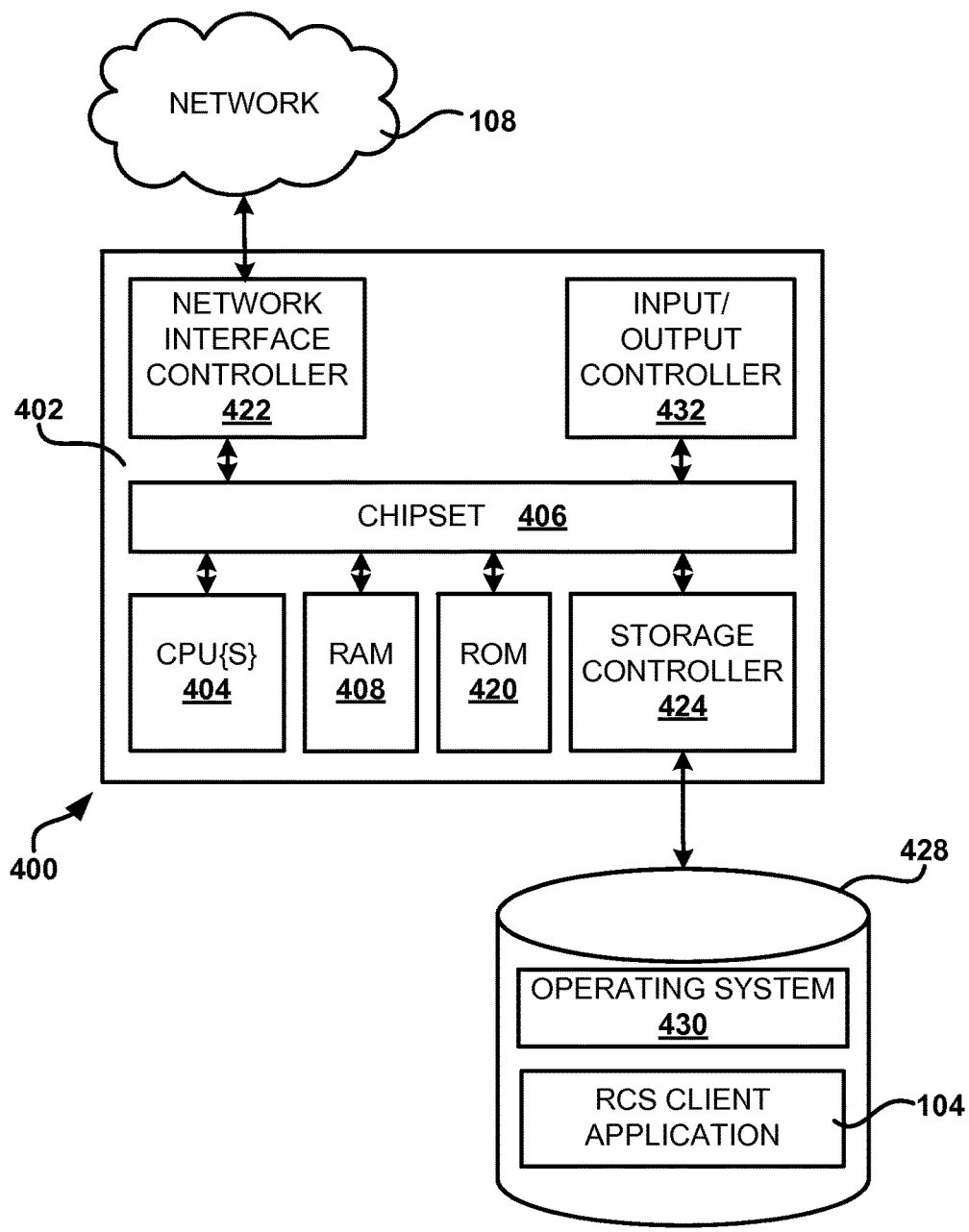
FIG. 4 is a computer architecture diagram showing an illustrative computer hardware architecture for implementing the various computing devices described in embodiments presented herein.

FIG. 4 shows an example computer architecture for a computer 400 capable of executing the software components described above. The computer architecture shown in FIG. 4 illustrates a conventional server computer, workstation, desktop computer, laptop, network appliance, personal digital assistant ("PDA"), e-reader, digital cellular phone, or other computing device, and may be utilized to execute any aspects of the software components presented herein.

The computer 400 includes a baseboard, or "motherboard," which is a printed circuit board to which a multitude of components or devices may be connected by way of a system bus or other electrical communication paths. In one illustrative embodiment, one or more central processing units ("CPUs") 404 operate in conjunction with a chipset 406. The CPUs 404 are standard programmable processors that perform arithmetic and logical operations necessary for the operation of the computer 400.

The CPUs 404 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 406 provides an interface between the CPUs 404 and the remainder of the components and devices on the baseboard. The chipset 406 may provide an interface to a random access memory ("RAM") 408, used as the main memory in the computer 400. The chipset 406 may further provide an interface to a computer-readable storage medium such as a read-only memory ("ROM") 420 or non-volatile RAM ("NVRAM") for storing basic routines that that help to startup the computer 400 and to transfer information between the various components and devices. The ROM 420 or NVRAM may also store other software components necessary for the operation of the computer 400 in accordance with the embodiments described herein.

The computer 400 may operate in a networked environment using logical connections to remote computing devices and computer systems through the network 108. The chipset 406 may include functionality for providing network connectivity through a network interface controller ("NIC") 422, such as a gigabit Ethernet adapter. The NIC 422 is capable of connecting the computer 400 to other computing devices over the network 108. It should be appreciated that multiple NICs 422 may be present in the computer 400, connecting the computer to other types of networks and remote computer systems.

The computer 400 may be connected to a mass storage device 428 that provides non-volatile storage for the computer. The mass storage device 428 may store system programs, application programs, other program modules, and data, which have been described in detail herein. The mass storage device 428 may be connected to the computer 400 through a storage controller 424 connected to the chipset 406. The mass storage device 428 may consist of one or more physical storage units. The storage controller 424 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 may store data on the mass storage device 428 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 428 is characterized as primary or secondary storage, and the like.

For example, the computer 400 may store information to the mass storage device 428 by issuing instructions through the storage controller 424 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 may further read information from the mass storage device 428 by detecting the physical states or characteristics of one or more particular locations within the physical storage units.

In addition to the mass storage device 428 described above, the computer 400 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 400.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 428 may store an operating system 430 utilized to control the operation of the computer 400. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 428 may store other system or application programs and data utilized by the computer 400, such as the RCS client application 104 and/or the other software components described above.

In one embodiment, the mass storage device 428 or other computer-readable storage media is encoded with computer-executable instructions which, when loaded into the computer 400, transforms the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the routine 300 described above with regard to FIGS. 3A-3C.

The computer 400 may also include an input/output controller 432 for receiving and processing input from a number of input devices, such as a keyboard, a mouse, a touchpad, a touch screen, an electronic stylus, or other type of input device. Similarly, the input/output controller 432 may provide output to a display, such as a computer monitor, a flat-panel display, a digital projector, a printer, a plotter, or other type of output device. It will be appreciated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for optimistic commit processing for an offline document repository have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A revision control system, comprising:
one or more processors; and
one or more memories, the one or more memories having stored thereon instructions that when executed by the one or more processors implement:
a plurality of document repositories that receive revision requests that comprise a change description and apply the revision requests using the change description;
a submission queue that stores revision requests awaiting processing by the document repositories;
a document repository state cache that stores summary information about the document repositories such that a first summary information is about a first document repository and a second summary information is about a second document repository; and
a submission endpoint configured to
receive a first revision request from a first client application and a second revision request from a second client application,
wherein the first revision request comprises a first repository identifier identifying the first document repository, a first version summary information describing an expectation of the first client application of contents of the first document repository prior to the first revision request, and a first change description,
wherein the second revision request comprises a second repository identifier identifying the second document repository, a second version summary information describing an expectation of the second client application of contents of the second document repository prior to the second revision request, and a second change description,
determine that the first document repository and the second document repository are in an offline state, determine that the first summary information stored in the document repository state cache matches within a specified range the first version summary information received with the first revision request, determine that the second summary information stored in the document repository state cache does not match within the specified range the second version summary information received with the second revision request, at least partly in response to the first summary information matching within the specified range the first version summary information, (i) en-queue the first revision request in a submission queue and ii.) transmit a first acceptance message to the first client application, without activating the first document repository, and at least partly in response to the second summary information not matching within the specified range the second version summary information, (i) activate the second document repository to process the second revision request and (ii) transmit a second acceptance message to the second client application, without placing the second revision request in the submission queue.

2. The system of claim 1, wherein the submission endpoint is further configured to:
determine that the first summary information stored in the document repository state cache exactly matches the first version summary information received with the first revision request.

3. The system of claim 1, wherein the first summary information stored in the document repository state cache and the first version summary information received with the first revision request each comprise a single representation of the contents of the first document repository.

4. The system of claim 1, wherein at least one of: the first summary information stored in the document repository state cache or the first version summary information received with the first revision request, comprises a plurality of representations of the contents of the first document repository.

5. The system of claim 4, wherein the submission queue is further configured to compare the first summary information stored in the document repository state cache and the first version summary information received with the first revision request in a preferential order.

6. A non-transitory computer-readable storage medium having computer-executable instructions stored thereupon which, when executed by a computer, cause the computer to:
receive a first revision request comprising a first repository identifier, a first version summary information describing an expected contents of a first document repository prior to the first revision request, and a first change description;
receive a second revision request comprising a second repository identifier, a second version summary information describing an expected contents of a second document repository prior to the second revision request, and a second change description;
determine that the first document repository identified by the first repository identifier and the second document repository identified by the second repository identifier are offline;
compare (i) the first version summary information with current contents of the first document repository and (ii) the second version summary information with current contents of the second document repository;

determine that the current contents of the first document repository matches within a specified range the first version summary information received with the first revision request;

determine that the current contents of the second document repository does not match within the specified range the second version summary information received with the second revision request;

place the first revision request in a submission queue and transmit a first acceptance message, without activating the first document repository; and activate the second document repository to process the second revision request and transmit a second acceptance message, without placing the second revision request in the submission queue.

7. The computer-readable storage medium of claim 6, having further computer-executable instructions stored thereupon which, when executed by the computer, cause the computer to:
place the first document repository into an active state;
remove the first revision request from the submission queue; and
apply the first revision request to the first document repository.

8. The computer-readable storage medium of claim 6, wherein comparing the first version summary information with current contents of the first document repository comprises comparing the first version summary information in the first revision request to summary information for the first document repository stored in a document repository state cache.

9. The computer-readable storage medium of claim 8, wherein the computer-executable instructions stored thereupon which, when executed by the computer, further cause the computer to update the summary information stored in the document repository state cache to reflect contents of the first document repository following application of the first revision request atomically applying the first revision request to the first document repository.

10. The computer-readable storage medium of claim 6, wherein the computer-executable instructions stored thereupon which, when executed by the computer, further cause the computer to update the summary information stored in the document repository state cache based upon the first revision request atomically with placing the first revision request in the submission queue.

11. The computer-readable storage medium of claim 9, wherein the first version summary information in the first revision request and the summary information for the first document repository stored in the document repository state cache each comprise data describing one or more of: the entire first document repository, one or more files in the first document repository, or a portion of one or more files in the first document repository.

12. The computer-readable storage medium of claim 9, wherein the first version summary information in the first revision request and the summary information for the first document repository stored in the document repository state cache each comprise one or more of: a version number, a hash value, or a time stamp.

13. The computer-readable storage medium of claim 9, wherein the computer-executable instructions stored thereupon which, when executed by the computer, further cause the computer to store data for use in rolling back the document repository state cache in the event that the first revision request cannot be applied to the document repository.

14. A computer-implemented method for optimistic commit processing for a document repository, the method comprising performing computer-implemented operations for:
- receiving a first revision request to revise data in a first document repository that is in an offline state, the first revision request comprising a first version summary information that describes an expected contents of the data requested to be revised;
- receiving a second revision request to revise data in a second document repository that is in the offline state, the second revision request comprising a second version summary information that describes an expected contents of the data requested to be revised;
- comparing the first version summary information with current contents of the data in the first document repository;
- comparing the second version summary information with current contents of the data in the second document repository;
- at least partly in response to the current contents of the data in the first document repository not matching within the specified range the first version summary information,
  - causing the offline first document repository to be placed into an active state,
  - applying the first revision request to the first document repository once the first document repository has been placed into the active state, and
  - transmitting a first acceptance message; and
- at least partly in response to the current contents of the data in the second document repository matching within the specified range the second version summary information,
  - placing the second revision request in a submission queue, and
  - transmitting a second acceptance message, without activating the second document repository.

15. The method of claim 14, wherein the first revision request further comprises a first repository identifier that identifies the first document repository and a first change description that describes a change to be made to the first document repository.

16. The method of claim 15, wherein comparing the first revision request with current contents of the data in the first document repository comprises comparing the first version summary information in the first revision request to a first summary information for the data in the first document repository stored in a document repository state cache.

17. The method of claim 16, wherein the first summary information stored in the document repository state cache and the first version summary information received with the first revision request each comprise a single representation of the current contents of the data.

18. The method of claim 16, wherein at least one of: the first summary information stored in the document repository state cache or the first version summary information received with the first revision request, comprises a plurality of representations of the current contents of the data, and wherein comparing the first summary information stored in the document repository state cache to the first version summary information received with the revision request comprises comparing the first summary information stored in the first document repository state cache and the first version summary information received with the first revision request in a preferential order.

19. The method of claim 18, wherein the first version summary information in the first revision request and the first summary information for the data stored in the first document repository state cache each comprise one or more of a version number, a hash value, or a time stamp.

* * * * *